United States Patent
Berg et al.

(10) Patent No.: US 12,396,925 B2
(45) Date of Patent: Aug. 26, 2025

(54) FILTER SYSTEM FOR A CLOSED FLUID-TRANSFER SYSTEM WITH PRESSURE EQUALIZATION

(71) Applicant: B. Braun Melsungen AG, Melsungen (DE)

(72) Inventors: Karl Martin Berg, Melsungen (DE); Varaprasad Sikhile, Melsungen (DE); Florin Kopp, Schortens (DE)

(73) Assignee: B. Braun Melsungen AG, Melsungen (DE)

( * ) Notice: Subject to any disclaimer, the term of this patent is extended or adjusted under 35 U.S.C. 154(b) by 386 days.

(21) Appl. No.: 18/018,826

(22) PCT Filed: Aug. 18, 2021

(86) PCT No.: PCT/EP2021/072882
§ 371 (c)(1),
(2) Date: Jan. 30, 2023

(87) PCT Pub. No.: WO2022/038167
PCT Pub. Date: Feb. 24, 2022

(65) Prior Publication Data
US 2023/0310275 A1   Oct. 5, 2023

(30) Foreign Application Priority Data
Aug. 20, 2020  (DE) ............ 10 2020 210 629.0

(51) Int. Cl.
*A61J 1/20*    (2006.01)
*B01D 19/00*   (2006.01)
(Continued)

(52) U.S. Cl.
CPC ............ *A61J 1/2086* (2015.05); *A61J 1/201* (2015.05); *A61J 1/2072* (2015.05); *A61J 1/2082* (2015.05);
(Continued)

(58) Field of Classification Search
CPC ........ A61J 1/2086; A61J 1/201; A61J 1/2072; A61J 1/2082; A61J 1/2096; A61J 1/2075;
(Continued)

(56) References Cited

U.S. PATENT DOCUMENTS

| | | |
|---|---|---|
| 4,743,243 A | 5/1988 | Vaillancourt |
| 5,125,415 A | 6/1992 | Bell |

(Continued)

FOREIGN PATENT DOCUMENTS

| | | |
|---|---|---|
| DE | 202009011019 U1 | 12/2010 |
| DE | 102017005791 A1 | 12/2018 |

(Continued)

OTHER PUBLICATIONS

Search Report received in International Application No. PCT/EP2021/072882 dated Jan. 24, 2022, with translation, 12 pages.

(Continued)

*Primary Examiner* — Leslie R Deak
(74) *Attorney, Agent, or Firm* — Christopher A. Rothe; CM Law (57) ABSTRACT

A filter system for a closed fluid transfer system with pressure equalization. The filter system includes a filter having a main flow direction for a fluid passing through the filter extending from a fluid inlet surface to a fluid outlet surface, and a filter housing. The filter has a greater or at least equal extension in the main flow direction compared to at least one direction transverse to the main flow direction.

22 Claims, 8 Drawing Sheets

(51) Int. Cl.
  *B01D 46/00* (2022.01)
  *B01D 46/24* (2006.01)
(52) U.S. Cl.
  CPC ..... *B01D 19/0031* (2013.01); *B01D 46/0012* (2013.01); *B01D 46/0036* (2013.01); *B01D 46/24* (2013.01); *B01D 2271/02* (2013.01); *B01D 2275/10* (2013.01)
(58) Field of Classification Search
  CPC ............ B01D 19/0031; B01D 46/0012; B01D 46/0036; B01D 46/24; B01D 2271/02; B01D 2275/10
  See application file for complete search history.

(56) References Cited

U.S. PATENT DOCUMENTS

| | | |
|---|---|---|
| 6,503,240 B1 | 1/2003 | Niedospial, Jr. et al. |
| 6,544,246 B1 | 4/2003 | Niedospial, Jr. |
| 6,656,433 B2 | 12/2003 | Sasso |
| 6,743,214 B2 | 6/2004 | Heil et al. |
| 6,832,994 B2 | 12/2004 | Niedospial, Jr. et al. |
| 7,743,799 B2 | 6/2010 | Mosler et al. |
| 7,900,659 B2 | 3/2011 | Whitley et al. |
| 7,981,101 B2 | 7/2011 | Walsh |
| 8,029,747 B2 | 10/2011 | Helmerson |
| 8,123,736 B2 | 2/2012 | Kraushaar et al. |
| 8,162,914 B2 | 4/2012 | Kraushaar et al. |
| 8,167,863 B2 | 5/2012 | Yow |
| 8,211,082 B2 | 7/2012 | Hasegawa et al. |
| 8,454,573 B2 | 6/2013 | Wyatt et al. |
| 8,469,939 B2 | 6/2013 | Fangrow, Jr. |
| 8,475,404 B2 | 7/2013 | Foshee et al. |
| 8,512,309 B2 | 8/2013 | Shemesh et al. |
| 8,628,508 B2 | 1/2014 | Weitzel et al. |
| 8,684,994 B2 | 4/2014 | Lev et al. |
| 9,132,062 B2 | 9/2015 | Fangrow |
| 9,321,545 B2 | 4/2016 | Pestotnik et al. |
| 9,339,438 B2 | 5/2016 | Lev et al. |
| 9,468,588 B2 | 10/2016 | Shemesh |
| 9,510,997 B2 | 12/2016 | Kriheli et al. |
| 9,585,812 B2 | 3/2017 | Browka et al. |
| 9,750,662 B2 | 9/2017 | Mansour et al. |
| 9,795,536 B2 | 10/2017 | Lev et al. |
| 9,822,891 B2 | 11/2017 | Cederschioeld |
| 9,839,580 B2 | 12/2017 | Lev et al. |
| 9,956,143 B2 | 5/2018 | Reynolds et al. |
| 9,980,878 B2 | 5/2018 | Marici et al. |
| 10,201,476 B2 | 2/2019 | Fangrow |
| 10,219,982 B2 | 3/2019 | Weir et al. |
| 10,258,541 B2 | 4/2019 | Cheng et al. |
| 10,299,990 B2 | 5/2019 | Lev et al. |
| 10,391,031 B2 | 8/2019 | Yevmenenko et al. |
| 10,426,703 B2 | 10/2019 | Russo et al. |
| 10,478,382 B2 | 11/2019 | Cederschiöld |
| 10,660,823 B2 | 5/2020 | Shluzas et al. |
| 11,491,085 B2 | 11/2022 | Mijers et al. |
| 2002/0193777 A1 | 12/2002 | Aneas |
| 2004/0073189 A1 | 4/2004 | Wyatt et al. |
| 2009/0030621 A1 | 1/2009 | Ahn |
| 2010/0063460 A1 | 3/2010 | Reed et al. |
| 2013/0144248 A1 | 6/2013 | Putter et al. |
| 2014/0305527 A1 | 10/2014 | Weibel |
| 2015/0250680 A1 | 9/2015 | Browka et al. |
| 2018/0000690 A1 | 1/2018 | Eichelkraut et al. |
| 2018/0161243 A1 | 6/2018 | Ariagno et al. |
| 2018/0214826 A1* | 8/2018 | Keaney ................ B01D 61/18 |
| 2019/0060171 A1 | 2/2019 | Lee |
| 2019/0083359 A1 | 3/2019 | Knudsen et al. |
| 2019/0094195 A1 | 3/2019 | Gentner |
| 2019/0151203 A1 | 5/2019 | Weir et al. |
| 2019/0321262 A1 | 10/2019 | Chudek et al. |
| 2019/0328613 A1 | 10/2019 | Yevmenenko et al. |
| 2019/0380908 A1 | 12/2019 | Henderson |
| 2020/0114071 A1 | 4/2020 | Mansour et al. |
| 2020/0254435 A1 | 8/2020 | Wu et al. |

FOREIGN PATENT DOCUMENTS

| | | |
|---|---|---|
| EP | 1192927 A2 | 4/2002 |
| EP | 1239808 | 9/2002 |
| EP | 1430864 A1 | 6/2004 |
| EP | 1631231 | 3/2006 |
| EP | 1853333 | 11/2007 |
| EP | 1858578 | 11/2007 |
| EP | 2134311 | 12/2009 |
| EP | 2079432 | 11/2010 |
| EP | 2254542 | 7/2012 |
| EP | 2512398 | 10/2012 |
| EP | 2512399 | 10/2012 |
| EP | 2526920 A2 | 11/2012 |
| EP | 2664550 A1 | 11/2013 |
| EP | 2501357 | 4/2014 |
| EP | 2271387 | 9/2014 |
| EP | 2419071 | 11/2014 |
| EP | 2872100 | 5/2015 |
| EP | 2811964 | 9/2015 |
| EP | 2968068 | 1/2016 |
| EP | 2240147 | 5/2016 |
| EP | 3057635 | 8/2016 |
| EP | 3067037 A1 | 9/2016 |
| EP | 3113812 | 1/2017 |
| EP | 2879644 | 2/2017 |
| EP | 3184440 A2 | 6/2017 |
| EP | 3250171 | 12/2017 |
| EP | 3250172 | 12/2017 |
| EP | 3250173 | 12/2017 |
| EP | 2983745 | 7/2018 |
| EP | 3449893 A1 | 3/2019 |
| EP | 2994086 | 6/2019 |
| EP | 3498251 A1 | 6/2019 |
| EP | 3924020 | 12/2021 |
| WO | 2004108060 A1 | 12/2004 |
| WO | 2006088783 A3 | 8/2006 |
| WO | 2006128500 A1 | 12/2006 |
| WO | 2008048631 A1 | 4/2008 |
| WO | 2008117178 A3 | 10/2008 |
| WO | 2009087572 A1 | 7/2009 |
| WO | 2009105489 A1 | 8/2009 |
| WO | 2009146088 A1 | 12/2009 |
| WO | 2010120953 A3 | 10/2010 |
| WO | 2011104711 A1 | 9/2011 |
| WO | 2011104712 A1 | 9/2011 |
| WO | 2012150587 A1 | 11/2012 |
| WO | 2013024120 A1 | 2/2013 |
| WO | 2013119823 A1 | 8/2013 |
| WO | 2014020414 A1 | 2/2014 |
| WO | 2014041529 A1 | 3/2014 |
| WO | 2014152249 A1 | 9/2014 |
| WO | 2014181320 A1 | 11/2014 |
| WO | 2014181324 A1 | 11/2014 |
| WO | 2015058136 A1 | 4/2015 |
| WO | 2015134777 A1 | 9/2015 |
| WO | 2016120155 A1 | 8/2016 |
| WO | 2017203511 A1 | 11/2017 |
| WO | 2020148748 A1 | 7/2020 |
| WO | 2020168175 A8 | 8/2020 |
| WO | 2021019532 A1 | 2/2021 |
| WO | 2021154909 A1 | 8/2021 |
| WO | 2021239869 A1 | 12/2021 |

OTHER PUBLICATIONS

Search Report received in German Application No. 10 2020 210 629.0 dated Jun. 2, 2021, with translation, 12 pages.

* cited by examiner

FILTER SYSTEM FOR A CLOSED FLUID-TRANSFER SYSTEM WITH PRESSURE EQUALIZATION

CROSS-REFERENCE TO RELATED APPLICATION(S)

This application is the United States national stage entry of International Application No. PCT/EP2021/072882, filed Aug. 18, 2021, and claims priority to German Application No. 10 2020 210 629.0, filed Aug. 20, 2020. The contents of International Application No. PCT/EP2021/072882 and German Application No. 10 2020 210 629.0 are incorporated by reference herein in their entireties.

FIELD

The invention relates to a closed fluid transfer system with pressure equalization.

BACKGROUND

Many substances which are administered as injections or in a comparable form of delivery, such as carcinogenic, mutagenic and reprotoxic ("CMR") drugs, which are used, for example, in cancer therapy and which, in their therapeutic application, are directed primarily at damaging growth-intensive tumor cells, exhibit a considerable hazard potential outside the actual therapeutic application. Due to their mechanism of action, some of these substances are themselves carcinogenic, which is why contact with persons not undergoing therapy must be avoided. So called "closed system transfer devices", also known as "CSTDs", are therefore increasingly being used for CMR drugs in the manufacture of ready-to-use preparations. An important component of such CSTDs are pressure equalization mechanisms that prevent toxic air components from escaping when liquids are injected into and removed from a drug container, such as a vial.

The pressure equalization mechanisms of current CSTDs are either based on systems in which toxic air components of the outflowing air are separated or collected in an equalization container. In the case of separation, pressure equalization is achieved, for example, by means of a hydrophobic filter membrane and a further filter made of activated carbon fabric connected in series. Compared to barrier systems, which may be limited to pressure equalization through a flexible volume without air exchange with the external environment, such filter systems require less storage space, lower expenses for disposal, and fewer protective measures for the user, for example with regard to a risk of damage, which exists in the case of barrier systems. Herein, it is disadvantageous that the safe separation of toxic air components must be reliably guaranteed.

In order to test sufficient filter performance, inter alia $TiCl_4$ tests (titanium tetrachloride tests, so-called "smoke tests") may be carried out. Due to the comparatively high pressure of about 1.7 kPa, it may be determined whether $TiCl_4$ smoke escapes through the filter into the external environment. Current filter systems often show that the escape of $TiCl_4$ cannot be reliably prevented during such tests.

SUMMARY

In view of the foregoing, it is an objective of the present invention to provide a filter system for a closed fluid transfer system with pressure equalization (pressure equilibration), the filter properties of which are improved, with smaller or constant installation space. Furthermore, it is an objective of the present invention to provide a withdrawal spike for a medical fluid transfer system with a filter system, the filter properties of which are improved, whereas the installation space is reduced or remains the same.

According to the invention, a filter system for a closed fluid transfer system with pressure equalization comprises a filter having a main flow direction for a fluid passing through the filter, the main flow direction extending from a fluid inlet surface to a fluid outlet surface, and a filter housing, wherein the filter has a greater or at least equal extension in the main flow direction compared to at least one direction transverse thereto.

In other words, the main flow direction in the filter is in a direction that is transverse to at least one smaller or at most equal extension of the filter. After configuring and arranging the filter in the fluid transfer system, the fluid inlet to the filter (fluid inlet surface) and the fluid outlet from the filter (fluid outlet surface) may be arranged accordingly such that the main flow direction in the filter is along the longer or at least equally long filter extension compared to at least one filter extension transverse thereto. Accordingly, the shortest filter extension is not selected for the flow through the filter.

Accordingly, the filter is arranged in the filter housing in such a way that the flow in the main flow direction is prolonged or at least equally long compared to the flow in at least one direction transverse thereto. Preferably, the filter is arranged in such a way that a larger extension (1), and further preferably a significantly larger extension (1), results in the main flow direction compared to at least one direction transverse thereto (d) (for designation "1" and "d", see FIGS. 4*a* and 4*b*). The larger extension (1) is in particular at least 1.1 times larger, preferably at least 1.5 times larger, further preferably at least twice as large, still further preferably at least 3 times larger than the extension (d) transversely thereto. Preferably, the greater extension (1) is in addition not more than 10 times greater than the extension (d) transversely thereto. On the one hand, this provides sufficient filter volume to filter gaseous elements. On the other hand, however, the filter volume is also not increased to such an extent that the flow rate is significantly affected. This differs from known filter systems, which often use a round filter membrane, wherein the membrane is arranged in such a way that the main flow direction is perpendicular to the round filter membrane surfaces. In this case, the fluid passing through the filter takes the shortest path through the filter. As a result, sufficient filtering action cannot be ensured over the short path in order to retain toxic substances or other substances to be filtered in the filter. In contrast, by extending the filter path according to the invention, a filter effect may be increased. The filter path is extended in the main flow direction at least with respect to a filter extension transverse thereto.

The main flow direction of the filter is defined by the arrangement of the filter in the filter system or in the filter housing of the filter system according to the thereby defined inlet and outlet surfaces for a fluid to be filtered. The main flow direction is formed by the shortest path between a fluid inlet surface and a fluid outlet surface. Thus, by arranging a filter extension which does not have the shortest extension at least in a direction transverse thereto, the filter path is not shortened compared to another arrangement. As described above, by arranging a filter extension in the main flow direction which is elongated at least with respect to a filter extension transversely thereto, the filter path may be equally elongated. In particular, the longest filter path may be selected by a filter extension in the main flow direction that is longer than in the directions transverse thereto. Accordingly, compared to the known prior art, the invention may be implemented, for example, in that the fluid to be filtered in the filter housing is not fed to the filter surface of a filter membrane and passed perpendicularly therethrough—in a direction parallel to the filter surfaces through a side surface located therebetween—but is passed between the filter surfaces via a side surface formed between the filter surfaces. In other words, the filter may be arranged in the housing rotated by 90° with respect to such prior art, for example, or the fluid supply and discharge may be redirected from the filter surfaces to the side surfaces. Alternatively or complementarily, however, the filter dimensions may also be adapted accordingly.

The present invention further provides a filter system which in itself solves the objective of achieving the highest possible filter efficiency with limited installation space in a filter housing.

This filter system is installed in a closed fluid transfer system and comprises a filter and a filter housing, wherein the filter is integrated in the filter housing in the form of a cylinder and is configured as a hollow cylinder with at least one fluid opening for fluid entry into the hollow cylinder, forming fluid inlet surface(s), and at least one fluid opening for fluid outlet from the hollow cylinder, forming fluid outlet surface(s), wherein the fluid inlet surface(s) and the fluid outlet surface(s) are arranged such that the main flow direction is either only radial from the inner wall of the hollow cylinder (inner wall of the hollow cylinder as fluid inlet surface(s)) to the outside (outer wall of the hollow cylinder as fluid outlet surface(s)), or only axial along and parallel to the longitudinal axis (L) of the hollow cylinder, or combined both radial and axial. Herein, at least in portions, the fluid inlet surface(s) (E) and/or the fluid outlet surface(s) (A) are formed on the hollow cylinder. The fluid opening(s) for fluid inlet into the hollow cylinder forming the fluid inlet surface(s) may thereby be arranged at a front face and/or at an end of the side surfaces of the hollow cylinder, and independently thereof or in correspondence with the fluid inlet surface(s), the fluid opening(s) for fluid outlet from the hollow cylinder forming the fluid outlet surface(s) may be arranged at the opposite front face and/or at the other end of the side surfaces of the hollow cylinder.

This technical solution may be used independently, but it may advantageously be combined with the above-described embodiment by arranging fluid opening(s) for fluid inlet into the hollow cylinder (fluid inlet surfaces E) and the fluid opening(s) for fluid outlet from the hollow cylinder (fluid outlet surfaces A) in such a way that the main flow direction in the filter is along the longer or at least equally long filter extension compared to at least one filter extension transversely thereto.

Figure 14:
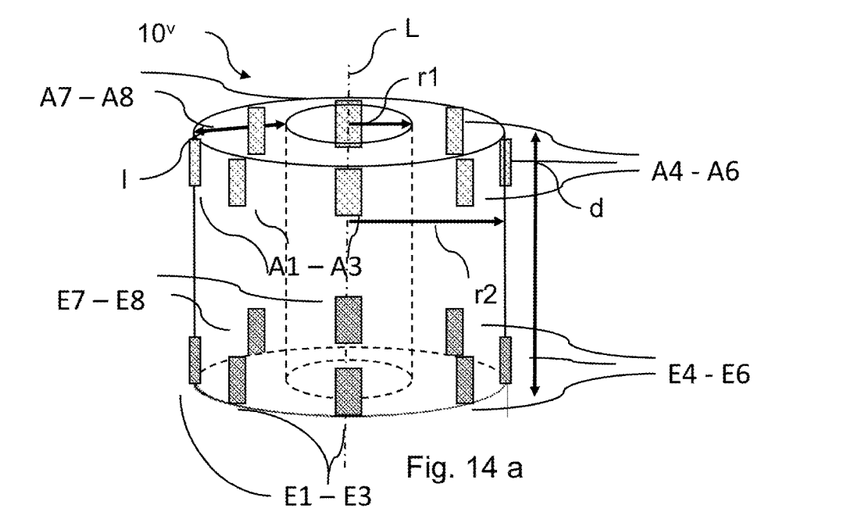
FIGS. 14a to 14c show perspective views of a further exemplary embodiment of a filter as a cylindrical hollow body.

With reference to the designations "1" and "d" in FIGS. 14a to 14c, this means that 1 may have a smaller extension than d, but that—independently—the extension of the fluid flow in the main flow direction may be variably adjusted depending on the geometry and the dimensions of the filter hollow cylinder and depending on the arrangement of the fluid inlet surfaces E and the fluid outlet surfaces A in the filter housing.

The technical solutions according to the invention achieve a significantly better filtering effect than conventional filters for medical equipment and especially for a withdrawal spike for a medical fluid transfer system. The filter effect is so good that the filter system according to the invention for a closed fluid transfer system with pressure equalization easily passes the standardized smoke test defined in the introductory section above. Moreover, according to the invention, the improved filter effect is achieved with the same installation space of the filter system or withdrawal spike for a medical fluid transfer system.

The filter systems according to the invention thus defined may advantageously be integrated in a medical fluid transfer system for transferring medical fluids from one medical container to another medical container, in particular for a closed system transfer device and/or for the purpose of pressure equalization between medical devices.

In an embodiment, the filter may be retained in a filter receptacle of the filter housing by a filter cover. Depending on the installation depth, the filter may then be compressed to a different extent by the filter cover.

The filter receptacle may comprise at least one portion opposite the filter cover, configured to hold the filter in a fixed position between the filter cover and the filter receptacle. In particular, the extension of the filter between the surfaces provided for abutment against the filter cover and the filter receptacle is, at least in portions, greater than the maximum distance between the filter cover and the filter receptacle for holding the filter between the filter cover and the filter receptacle in a positionally fixed manner. As a result, the filter may be compressed between the filter cover and the filter receptacle, at least in portions, such that a fluid-tight, in particular air-tight seal is provided with respect to the contact surfaces.

According to a further development, the filter cover may comprise an opening through which a fluid passing through the filter may be discharged to an environment located on the side of the filter cover facing away from the filter.

By the arrangement of the filter cover and the opening, the fluid outlet may be configured such that a fluid passing through the filter via the fluid inlet surface travels at least a certain flow path in the main flow direction. For example, if a circular filter membrane is arranged in a filter system such that the fluid inlet surface and fluid outlet surface are formed by the side surface formed between the filter surfaces, the opening of the filter cover may be arranged on a side of the fluid outlet surface. However, the opening may also be arranged on a filter surface, which then forms the fluid outlet surface in the area of the opening if the fluid inlet surface on the side surface and fluid outlet surface on the filter surface may ensure sufficient filtration. However, the opening may also be open to two spatial directions. By the arrangement and design, the main flow direction may be adjusted in this way.

In particular, the filter cover may, at least in portions, abut a surface of the filter that is substantially perpendicular to the main flow direction of the fluid passing through the filter.

The filter may thereby be squeezed, for example, by the filter cover transversely to the main flow direction in order to be able to press the filter into the filter receptacle in a fluid-tight manner. The filter may thus be arranged between the filter cover and the filter receptacle in such a way that the contact surfaces of the filter on the filter cover and the filter receptacle are perpendicular to the main flow direction, at least in portions. The filter may thus also be compressed or squeezed in the main flow direction.

Alternatively, the filter cover may contact, at least in portions, a surface of the filter substantially parallel to the main flow direction of the fluid passing through the filter. Alternatively or in addition to the vertical arrangement, abutment surfaces may also be provided, at least in portions, parallel to the main flow direction. The filter may thus be compressed or squeezed vertically and/or in the main flow direction.

Through this, the filter cover may, for example, as already addressed above, elongate or shorten the flow path in respective directions by appropriate elastic compression of the filter element as required. In addition, however, an arrangement of the filter cover being appropriate for the application may keep the filter fluid-tight in the filter receptacle. In this way, tolerances transverse to the main flow direction may then also be compensated for. Similarly, also as addressed above, the length of the flow path in the main flow direction may be ensured or influenced.

In an embodiment, the filter is surrounded, at least in portions, in a direction essentially parallel to the main flow direction of the fluid passing through the filter by an elastically deformable support element, in particular made of silicone or a thermoplastic elastomer.

By using the elastically deformable support element, fluid-tight retention of the filter in the filter receptacle may be achieved as an alternative or supplement to the elastic deformability of the filter. In the elastically deformable support element, compressible materials in particular may thus be used, at least in portions. However, elastic deformability and sealing may also be enabled, by way of example, by the use of spring joints. The elastic deformability may thus be realized by material properties and/or the geometric design of the support element.

According to a further development, the support element extends from an end of the filter facing away from the filter cover over a length of 1 mm to 15 mm, in particular 2 mm to 8 mm.

Provided that, e.g., the filter is not elastically deformed or elastically deformable in order to lie fluid-tight in a filter receptacle, at least a portion of the filter in the main flow direction may be held in a fluid-tight manner over the length of the support element. Over this length, it is also not possible for the fluid passing through the filter to leave the filter. Thus, a minimum length of the flow path of the fluid through the filter may be ensured. Lengths of less than 1 mm may not ensure this over a wide range of applications. Safety increases with increasing length, so a length of at least 2 mm may be preferred. On the other hand, lengths longer than 15 mm may be disadvantageous due to space requirements or also due to reduced dynamics of pressure equalization.

In an embodiment, the filter has an extension of at least 2 mm, in particular at least 6 mm, and at most 15 mm, in particular at most 10 mm, in the main flow direction of the fluid passing through the filter.

Similar to the minimum length of the above support element, the filter should also provide a sufficient length of the flow path in the main flow direction. Likewise, the maximum extension in the main flow direction may be adapted to the spatial conditions and the required pressure equalization dynamics. In this sense, a further extension of the filter (and/or the support element that is applicable in a comparable manner) in the main flow direction no longer provides an improvement that is essential to the requirements.

Alternatively or additionally, the filter may have a volume of at least 60 $mm^3$, preferably at least 70 $mm^3$, in particular at least 80 $mm^3$, and at most 400 $mm^3$, preferably at most 260 $mm^3$, in particular at most 200 $mm^3$.

Via the volume, the filter effect may be maintained with a reduced length in the main flow direction with an appropriate flow area perpendicular to the main flow direction in correspondence with a greater length with a smaller flow area. The filter volume thus refers to a volume effective for filtration.

According to a further development, the filter system may be non-detachably connected to the closed fluid transfer system.

Thus, when properly handled, it may be ensured that no substances escape to the outside that have not passed through the filter of the filter system or another comparable filter system.

In an advantageous embodiment, the filter may be rotationally symmetrically surrounded by the above-mentioned filter receptacle, the above-mentioned filter cover and/or the above-mentioned support element in a radial direction with respect to the main flow direction of the fluid passing through the filter.

Due to the rotationally symmetrical accommodation of the filter, a uniform surface pressure in the circumferential direction may be achieved such that each flow path passing through the filter via the fluid inlet surface is subject to essentially the same conditions in the main flow direction, which may be influenced by the areal compression.

In addition, this may also allow approximately the same flow paths to be formed for the fluid in the main flow direction, at least in portions. In other words, a single flow path is not substantially shorter than the other flow paths, or at least a minimum length of all flow paths results.

According to a further development, the filter is configured such that a respective flow path of a fluid passing through the filter is longer than the extension of the filter in the main flow direction of the fluid passing through the filter.

Accordingly, the fluid is deflected as it passes through the filter, i.e., the flow path is elongated compared to direct passage. In the case of an activated carbon filter, the flow path may in this sense be configured such that the fluid to be filtered experiences sufficient surface contact with the carbon during a filter passage. The carbon may be contained in the filter in the form of a granular material, fabric, and as a mixture with plastic materials or the like.

In particular, the filter may comprise at least two filter layers extending substantially perpendicular to the main flow direction.

Herein, the extension of the flow path may be assisted by allowing the fluid to distribute in the space formed between the filter layers after passing through one filter layer and before passing through the next filter layer. A comparable effect may also be achieved if the filter layers lie directly on top of each other.

In an embodiment, the filter or at least one of the filter layers, in particular all filter layers, comprises a deflecting structure, in particular a fabric structure and/or granules extending substantially perpendicular to the main flow direction.

The extension of the flow path may be specifically influenced by the deflection means. For example, the width of the fabric fibers may be used to adjust the length of a flow path component that is transverse to the main flow direction. Similarly, different granule sizes may be used.

According to a further development, at least two successive filter layers have a fabric structure, each of which is offset from the other.

The offset increases the probability that pathways formed by the fabric structures are not directly above one another in the main flow direction such that lateral deflections repeatedly occur. In other words, this avoids, as far as possible, a fluid passing through the successive filter layers without deflection.

In an embodiment, the filter is configured as a cylindrical solid body.

The formation of the filter as a cylindrical solid body may be predetermined by the shape of the filter itself. Alternatively or additionally, the arrangement of the filter in the filter system may also condition the cylindrical design. In other words, the filter may be pressed into a cylindrical shape, at least in portions, if it has the appropriate elasticity and, for example, a larger volume than the filter receptacle. Provided that the filter is deformed, a uniform deformation may also provide a uniform filtering effect or filter pathway layout. However, the deformation may also be provided non-uniformly in order to be able to selectively select or also adapt locally different filter effects and/or different layouts of the filter pathways.

In an embodiment, the front faces of the cylinder may form the fluid inlet surface and the fluid outlet surface. Accordingly, the main flow direction runs from one front face of the cylindrical solid to the other front face. In this case, the length of the cylinder along its longitudinal axis is equal to, in particular greater than, the diameter of the cylinder.

In an alternative embodiment, the fluid inlet surface and the fluid outlet surface may be formed by the outer wall and radially with respect to the longitudinal axis. Accordingly, the main flow direction is then essentially radial to the longitudinal axis. In this case, the length of the cylinder along its longitudinal axis is equal to, in particular smaller than, the diameter of the cylinder or a filter path in the main flow direction.

Herein, the term "solid body" does not refer to a dense body but to a shape without geometric interruptions. In other words, the solid body further has a permeability or porosity required for filtration but is not a hollow body. Such a hollow body will be described further below.

Alternatively, the filter is configured as a hollow body comprising at least one opening into the hollow body.

Through the opening, a fluid to be filtered may enter the hollow body and distribute in the hollow volume. In particular, the inner wall of the hollow body thereby forms, at least in portions, the fluid inlet surface for the fluid to be filtered. The fluid outlet surface is then formed by at least a portion of the outer wall. Conversely, however, the filter may also filter a fluid flowing in the opposite direction. For this fluid, at least a portion of the outer wall then becomes the fluid inlet surface and the inner wall is configured, at least in portions, as the fluid outlet surface. The reversed direction of flow also generally relates to other filter designs in which bidirectional filtration may occur.

In particular, the filter is configured as a hollow cylinder. Preferably, an inner wall of the hollow cylinder parallel to the longitudinal axis of the hollow cylinder configures, at least in portions, the fluid inlet surface and/or the fluid outlet surface.

Accordingly, the flow through the hollow cylinder is at least initially in the radial direction. If the outer wall of the hollow cylinder forms, at least in portions, the fluid outlet surface or—depending on the direction of flow—fluid inlet surface parallel to the longitudinal axis of the hollow cylinder, and if this surface and the fluid inlet surface or fluid outlet surface of the inner wall are opposite each other in the radial direction, the main flow direction is radial to the longitudinal axis of the hollow cylinder. By offsetting the respective fluid inlet surface and fluid outlet surface in the direction of the longitudinal axis, the main flow direction may have axial components in the radial direction at least in portions, i.e. it may run deflected from a purely radial direction. Alternatively or additionally, the fluid outlet surface or fluid inlet surface may be formed, at least in portions, by at least one of the front faces of the hollow cylinder for cooperation with the fluid inlet surface or fluid outlet surface of the inner wall of the hollow cylinder. In this case, the main flow direction is also deflected from a purely radial direction. If, as a result of the above alternatives, the main flow direction is not radial with respect to the longitudinal axis of the hollow cylinder, the filter portion may be further elongated.

In an embodiment, the filter is hydrophobic, in particular an activated carbon filter.

The filtering effect is thus targeted at the substances to be filtered and is not reduced by moisture absorption. For example, an activated carbon filter may be used as a hydrophobic filter, for instance a filter made of a fabric of activated carbon fibers or of a sintered material of activated carbon particles.

According to an aspect, the present invention is directed to a filter system, wherein the filter is installed in a housing sealed to the outside, wherein in a smoke test no smoke is released to the outside when smoke-forming $TiCl_4$ is introduced.

According to a further aspect, the present invention is directed to a filter system, wherein up to at least 200 ml of smoke-forming $TiCl_4$ is absorbable by the filter.

In yet another aspect, the present invention is directed to a medical fluid transfer system for transferring medical fluids from one medical container to another medical container, particularly for a closed system transfer device and/or for the purpose of equalizing pressure between medical containers or devices. The one and/or the other medical container or device may each be selected from vials, vessels, medical syringes, medical tubes. More particularly, the present invention relates to a medical fluid transfer system that is configured as a withdrawal spike for withdrawing medical fluids from containers.

The withdrawal spike suitably comprises a handle portion connected to a piercing mandrel. The withdrawal spike typically comprises, in the piercing mandrel, a vent channel and a liquid channel, wherein each channel opens into an appropriate filter—the vent channel into an air filter and the liquid channel into a liquid filter. In a preferred embodiment, the air filter and the liquid filter are arranged in the housing of the withdrawal spike in respective first and second filter chambers. The withdrawal spike for withdrawing medical liquids from containers may for instance be designed as described and shown in EP 1 192 927 A.

In an embodiment, the withdrawal spike comprises at least the filter system described above, wherein the filter system is fluidically connected to the vent channel. The filter of the filter system is used at least as an air filter.

Preferably, the withdrawal spike has an additional air filter and/or liquid filter that is/are also fluidically connected to the vent channel. The withdrawal spike may alternatively or additionally have another or the same liquid filter for the liquid channel.

With respect to the vent channel, the additional air filter and/or the liquid filter is/are arranged between the vent channel and the filter.

In particular, the additional air filter and/or the liquid filter is/are held in a fixed position in the withdrawal spike by the filter.

In an exemplary embodiment, the air is discharged from the vent channel on a side facing away from the piercing mandrel. The outflowing air is then first passed through the additional air filter. The additional filter is designed, for example, as a hydrophobic filter that primarily retains liquids, particles, microorganisms and/or aerosols entrained in the vent channel. Such a filtration may already be sufficiently ensured via a comparatively short filter path. Therefore, the additional air filter may be configured as a conventional filter membrane in which the main flow direction is essentially perpendicular to the planar filter surfaces. In other words, it may be sufficient here that the shortest filter extension is used for the throughflow. The air flowing out of the vent channel is filtered in this way and then passed through the filter of the filter system. In this case, the filter serves at least as an additional air filter, wherein the filter is in particular intended for filtering toxic gases. In particular, to sufficiently ensure the retention of toxic gases, the filter according to the invention is used to extend the filtering distance and thus provide a more effective filtering effect.

In a further development, the filter is designed as a hollow cylinder and is arranged radially around the longitudinal axis of the vent channel or around the outlet surface of the additional air filter. The inner wall of the filter, which thus functions as a fluid inlet surface, may be used in particular circumferentially such that the air to be filtered may be distributed over the comparatively large fluid inlet surface. As a result, the air may flow through the filter not only over a longer distance, but also at higher flow rates and/or with a lower volume of air to be filtered per filter volume.

According to the invention, the medical fluid transfer system in general and the withdrawal spike in particular further comprise—possibly in addition to further conventional filters—a filter (referred to in the exemplary embodiments described below as filter 10, 10' or 10", respectively) which is configured such that the main flow direction of a fluid in the filter (10, 10' or 10", respectively) has a greater or at least equal extension (1) compared to at least one direction transverse thereto (d). For a more detailed description of this specifically configured filter, reference is made to the above description, wherein the filter in accordance with the invention as described above is typically implemented in pressure equalization or aeration or deaeration channels of medical fluid transfer systems. Accordingly, in a withdrawal spike, the filter according to the invention communicates with the aeration channel. This ensures that any toxic substances of CMR drugs are effectively retained in corresponding pressure equalization or aeration or deaeration channels.

In particular, the withdrawal spike may be a mini-spike that is reduced in size compared to other embodiments. By flowing through the filter in a main flow direction along the longest filter extension according to the invention, improved filtration may be achieved with the same installation space, for example, by modifying the flow supply and filter intake, or an equally effective filtration may be achieved with a smaller installation size or smaller positional space. In other words, miniaturization may be supported by the flow paths and/or arrangement of the filter for flow according to the invention.

BRIEF DESCRIPTION OF THE DRAWING FIGURES

In the following, the invention will be explained in more detail with reference to the accompanying figures.

DETAILED DESCRIPTION

Figure 1:
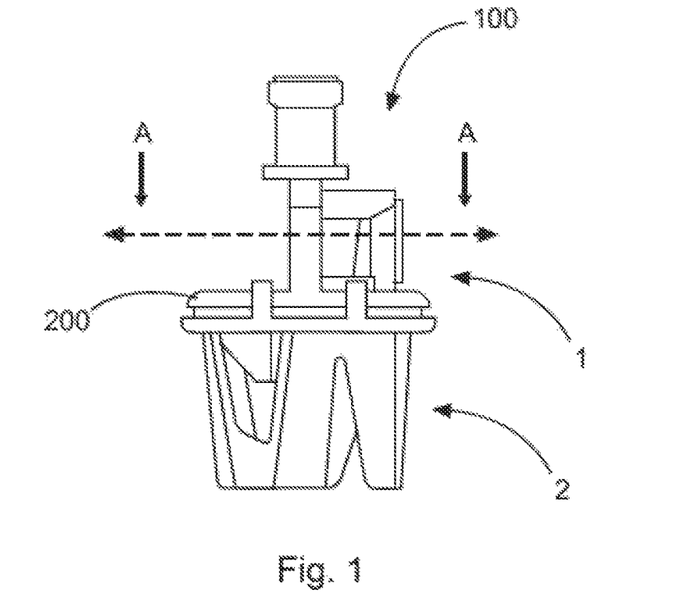
FIG. 1 shows a side view of a portion of a closed fluid transfer system with a filter system attached to a filter system receptacle.
Figure 5:
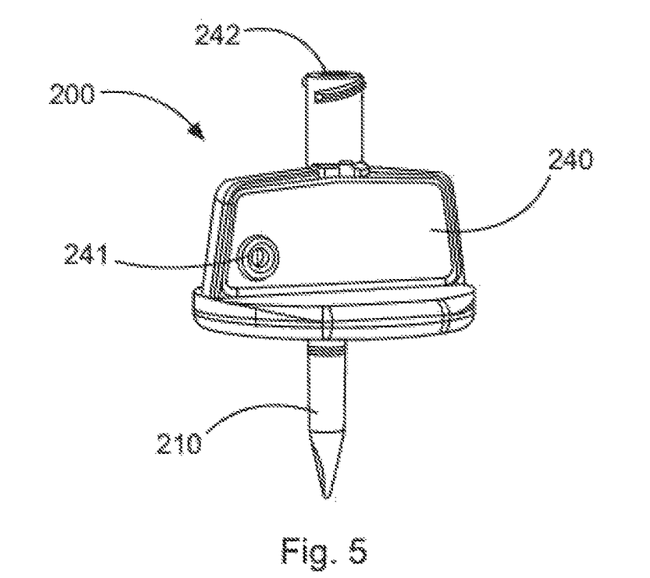
FIG. 5 shows a perspective view of an exemplary withdrawal spike for use with a filter system according to the invention.
Figure 6:
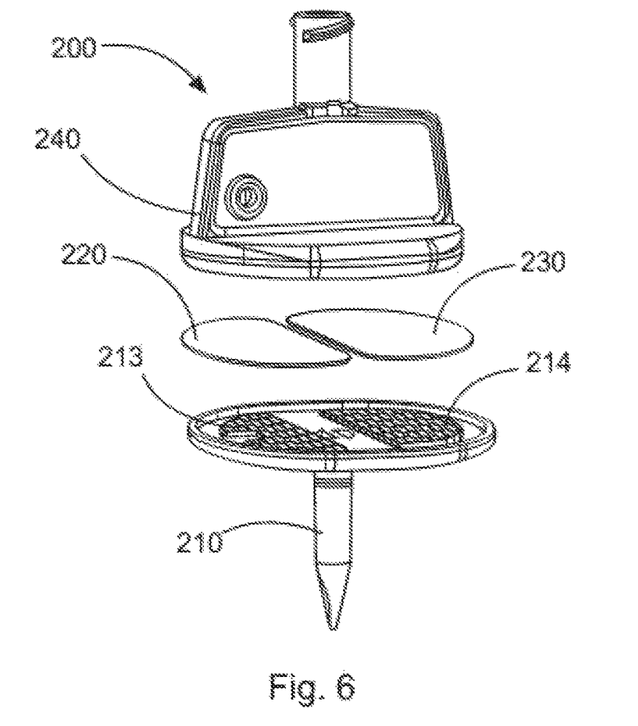
FIG. 6 shows a perspective exploded view of the withdrawal spike according to FIG. 5.
Figure 7:
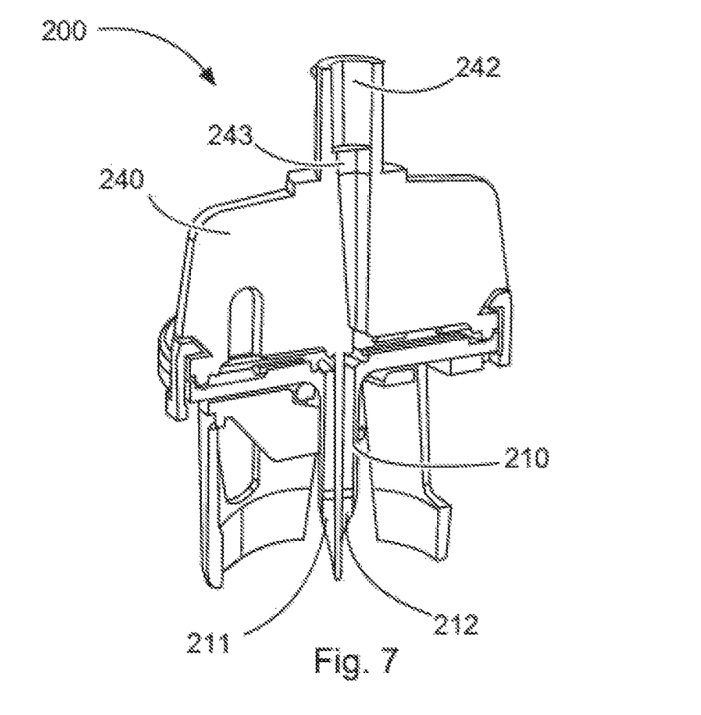
FIG. 7 shows a perspective sectional view of the withdrawal spike according to FIG. 5.

FIG. 1 shows a portion of a closed fluid transfer system 100 with a filter system 1 attached to a filter system receptacle 2. The filter system receptacle 2 may, for example, be a so-called "spike adapter" which may be placed on a drug container and may convey fluid out of the drug container via the internal piercing mandrel 210 of a withdrawal spike 200 (FIGS. 5 to 7). The filter system 1 serves to provide the necessary pressure equalization in the event of a fluid exchange. In addition, the filter system 1 may also include a forwarding portion for the liquid withdrawn from the drug container. The filter system 1 is welded onto the filter system receptacle 2, for example by an ultrasonic welding process, but may also alternatively or, for further securing, additionally be held on the filter system receptacle 2 by latching hooks.

Figure 2:
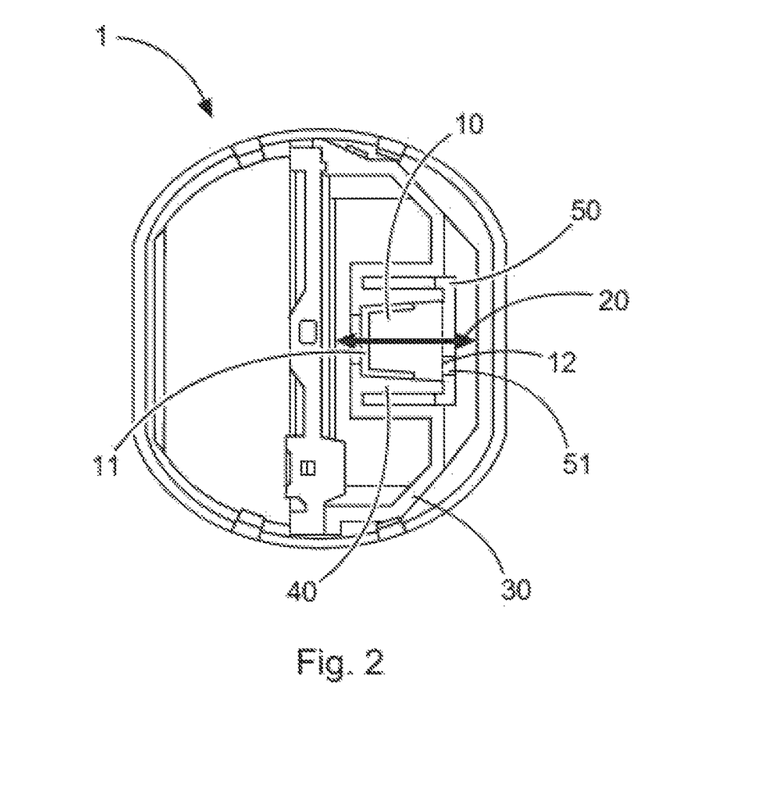
FIG. 2 shows a cross-sectional view of the exemplary filter system according to the section line indicated by arrows A-A in FIG. 1.

According to the sectional line A-A shown in FIG. 1, FIG. 2 shows a cross-sectional view of the corresponding exemplary filter system 1 according to FIG. 1. The filter system 1 has a filter housing 30 with a filter receptacle 40 formed therein. A filter 10 is held in the filter receptacle 40 by a filter cover 50. Herein, the filter 10 has a fluid inlet surface 11 and a fluid outlet surface 12, wherein the main flow direction 20 extends from the fluid inlet surface 11 to the fluid outlet surface 12. The fluid inlet surface 11 is formed on a side of the filter 10 open to a fluid channel. The fluid outlet surface 12 is defined as the surface which serves for fluid exchange with the external environment, i.e. is in fluid communication with the external environment—directly or indirectly—as seen from the filter 10. In the embodiment shown, the fluid outlet surface 12 corresponds to an opening 51 provided in the filter cover 50.

As can be seen from FIG. 2, the extension of the filter 10 is greater in the main flow direction 20 of the fluid passing through the filter 10 than transversely thereto. Accordingly, the filter 10 is arranged in such a way that the flow path is maximized. This ensures that the main flow direction is in a direction (shown with a double arrow with reference sign 20) that is transverse to the smaller filter extension. Accordingly, the filter effect may be optimized with the same space requirement by the arrangement of the fluid inlet area 11 and fluid outlet area 12.

Figure 3:
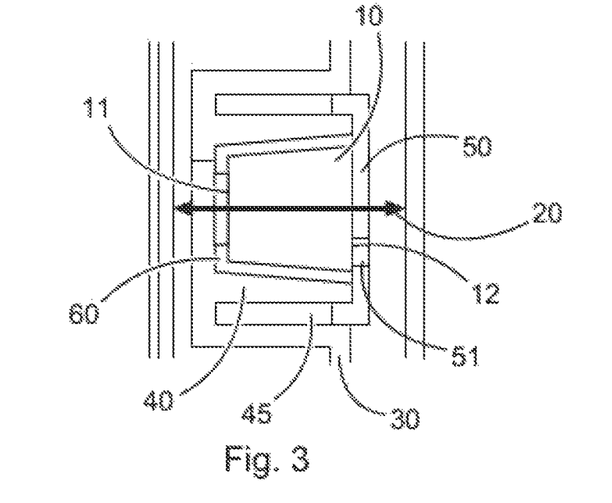
FIG. 3 shows an enlarged portion around the area of the filter receptacle of the filter system according to FIG. 2.

FIG. 3 shows the area around the filter receptacle 40 of the filter system according to FIG. 1 in a further enlarged view. The enlarged view clearly shows that the filter 10 is held in the filter receptacle 40 by a support element 60. The support element 60 is formed of silicone, as an example, and may thus seal the area between the filter 10 and the filter receptacle 40 in a radial direction to the main flow direction 20 in a fluid-tight manner by means of its compressibility. By the indicated length x of the support element 60 in the main flow direction 20, it may furthermore be ensured that each fluid flowing through the filter 10 from the fluid inlet surface 11 is guided in the filter 10 in the main flow direction 20 over at least this length.

In addition, the enlargement also again shows the filter cover 50. The filter cover 50 is arranged on a side of the filter 10 to be associated with a fluid outlet surface 12. The filter cover 50 itself is held in a filter cover receptacle 45 for holding the filter 10 in the filter receptacle 40. For this purpose, the filter cover 50 may, for example, be pressed into, glued into, screwed into, or otherwise connected to the filter cover receptacle 45. For example, screwing the filter cover 50 into the filter cover receptacle 45 may adjust the distance between the fluid inlet surface 11 and the fluid outlet surface 12 as needed. The fluid outlet surface 12 is configured by the opening 51 of the filter cover 50, which exposes the corresponding portion of the filter surface for discharge. In the embodiment shown, the opening is arranged eccentrically to the longitudinal axis or central axis extending from the fluid inlet surface 11 to the opposite side of the filter. However, the opening 51 may also be arranged centrally.

Figure 4A:
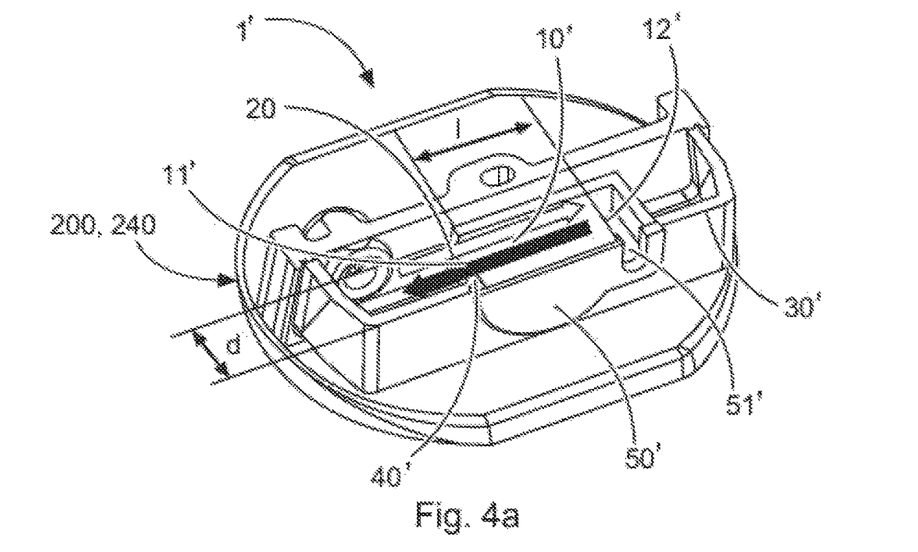
FIG. 4a shows a perspective view of a further exemplary embodiment of a filter system.
Figure 4B:
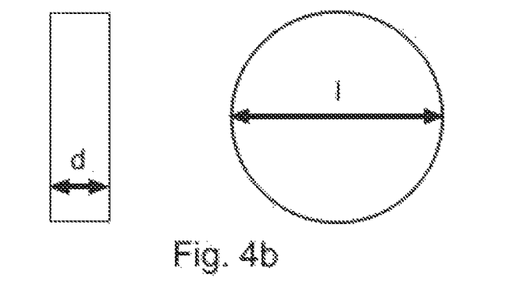
FIG. 4b shows a schematic representation of the filter shown in FIG. 4a in a side view and a top view.

FIG. 4a shows a further exemplary embodiment of a filter system 1' according to the invention. The perspective cross-sectional view of the filter system 1' corresponds to the section shown in FIG. 2. The filter 10' accommodated in the filter receptacle 40' has the shape shown in FIG. 4b. Accordingly, the filter 10' is formed of a round filter platelet, the filter surfaces of which have a diameter, i.e. a longer filter extension or maximum filter length 1, which is greater than the extension of the side surface or peripheral surface between the filter surfaces, i.e. a filter thickness d. Due to the orientation of the filter 10' in the filter housing 30' through the filter receptacle 40' shown in FIG. 4a, the fluid inlet surface 11' (FIG. 9) is located on a portion of the side surface of the filter 10'. The filter 10' abuts the filter receptacle 40' on one side perpendicular to the side surface and the housing cover 51' on the opposite side over its entire diameter, i.e., the filter length 1. Accordingly, the fluid inlet surface 12' (FIG. 9) is configured over a portion of the side surface of the filter 10' opposite the fluid inlet surface 11'. The area adjoining the fluid outlet surface 12' is confined by the filter receptacle 40' and the filter cover 50', and a fluid discharged from the filter 10' may be discharged through the opening 51' of the filter cover 50'. By installing/inserting the filter 10' and by arranging the fluid inlet 11' and the fluid outlet opening 51, the extension of the filter 10' is greater in the main flow direction 20 of the fluid passing through the filter 10' than transversely thereto. That is, the filter 10 is arranged such that the flow path becomes maximum. In other words, the main flow direction 20 again runs in a direction and over a distance 1 (shown with double arrow with reference sign 20) that is transverse to the smaller filter extension d. This means that here, too, the arrangement of the filter 10' or of the fluid line to the filter 10' elongates the flow path 70 of the fluid to be filtered compared with the prior art and thus makes more effective use of the filter 10'.

FIG. 5 again shows an exemplary withdrawal spike 200 for the arrangement of the filter housing 30' according to FIG. 4a. The filter housing 30' may be modularly attached to or monolithically formed with the withdrawal spike 200 or a vent housing portion 240 of the withdrawal spike 200. The features described in connection with the filter system according to the invention may advantageously be combined with the features of the withdrawal spike by integrating the filter system into the withdrawal spike at a suitable location or installation space. This description of the withdrawal spike thus applies by way of example to an installation of the filter system according to the invention, if appropriate, in another medical fluid transfer system.

The withdrawal spike 200 according to FIG. 5 comprises a withdrawal mandrel 210, which is adjoined at its end remote from the mandrel tip by a vent housing portion 240. The vent housing portion 240 comprises a vent opening 241 through which a gaseous fluid may be discharged for deaeration and/or supplied to the withdrawal spike 200 for aeration. In this sense, the terms deaeration, aeration, venting, ventilation, and vent may be used interchangeably. However, depending on the application requirements, only aeration or deaeration may be provided by a check valve or comparable unidirectional blocking devices. For example, if the withdrawal spike 200 is flow-connected to the filter 10' via the filter housing 30', ambient air filtered through the filter 10' may be introduced into the withdrawal spike 200 via the vent opening 241. Conversely, a gaseous fluid may be supplied to the filter 10' via the vent opening 241 and discharged through the filter 10' to the ambient environment as a filtered fluid. According to FIG. 4a, the flow through the filter 10' is transverse to its shorter extension. The withdrawal spike 200 also comprises a liquid opening 242 on a side facing away from the withdrawal mandrel 210, via which a liquid from a further container may be conducted into the withdrawal spike and/or introduced from the latter into the further container.

With reference to the exploded view of the withdrawal spike 200 shown in FIG. 6, the further structure of the withdrawal spike 200 is illustrated in an exemplary embodiment. The housing of the withdrawal spike 200 is composed of the piercing mandrel 210 and the vent housing portion 240. The piercing mandrel 210, or the end thereof facing away from the mandrel tip, comprises a widened portion which is connectable to the vent housing portion 240 and comprises an air filter chamber 213 for receiving an air filter 220 and a liquid filter chamber 214 for receiving a liquid filter 230.

For flow of a liquid and a gaseous fluid through the withdrawal spike 200, FIG. 7 again shows a cross-sectional view. The piercing mandrel 210 comprises a vent channel 211 extending from the mandrel tip and a liquid channel 212. The liquid channel 212 may allow a fluid to flow from a container on the mandrel tip side into the liquid filter chamber 214 (FIG. 6) and through the liquid filter 230 (FIG. 6). In the vent housing portion 240, after passing through the liquid filter 230, the liquid may be introduced into a container on the liquid opening side via a liquid opening channel 243 or then finally the liquid opening 242. In an analogous manner, the transfer of a fluid may also occur from a container on the fluid opening side in the reverse direction to a container on the mandrel tip side.

The foregoing transfer of fluid in a closed fluid transfer system may require pressure equalization, which in the embodiment shown is implementable as the vent channel 211. Pressure compensation is exemplified here using a deaeration, but is analogously applicable to an aeration when air flows in the reverse direction. For ventilation or pressure reduction, for example, air from a container on the mandrel tip side may be directed via the vent channel 211 into the air filter chamber 213 (FIG. 6) and flow through the air filter 220 (FIG. 6). The air or other gaseous substance filtered thereby may then be discharged from the vent housing portion 240 via the vent opening 241. As already explained with reference to FIG. 4*a*, the air or other gaseous substance discharged from the vent opening 241 is not directly discharged to the surroundings, but passes through the filter 10' of the filter system 1' in the manner already described with respect to FIG. 4*a*. The underlying principle of flow through for ventilation is not limited to the filter 10' or filter system 1' shown in FIG. 4*a*, but is equally applicable to other embodiments. The additional filtration by the filter 10' of the filter system 1' may be provided, for example, for redundancy reasons or to supplement the function of the air filter 220 if the latter does not have sufficient filtration per se or for respective gaseous fluids to be filtered. However, the air filter 220 may also be omitted if the filter 10' is used.

Figure 8A:
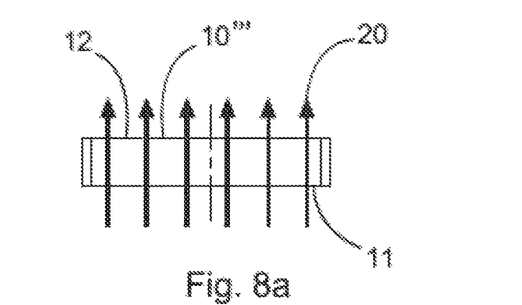
FIG. 8a shows a schematic representation of the flow through a filter according to the state of the art.
Figure 8B:
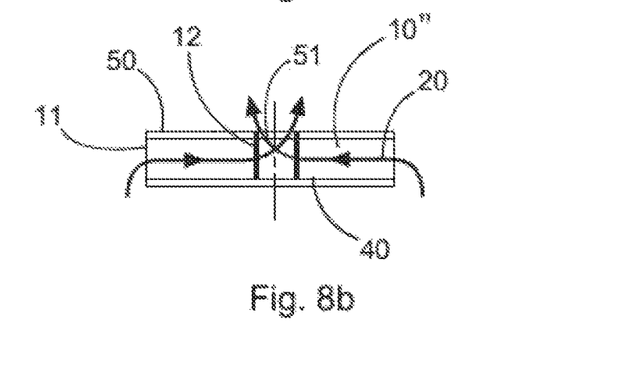
FIG. 8b shows a schematic representation of the flow through a filter according to an exemplary embodiment according to the invention.

To clarify the distinction of the principle of the filter system according to the invention—regardless of whether considered on its own or integrated into a medical fluid transfer system or specifically into a withdrawal spike—compared to the prior art, FIGS. 8*a* and 8*b* also show a comparison once again. Here, the respective main flow directions are represented by a single arrow. For the sake of explanation, the filters 10" and 10''' are assumed to be equally configured as round filter plates, for example. The directional indications used in the following for comparison refer to a longitudinal axis extending in each case through the round filter surfaces. According to the prior art shown in FIG. 8*a*, fluid flows through a filter 10''' in the axial direction. The fluid inlet surface 11 and the fluid outlet surface 12 are thereby formed by the round filter surfaces. The main flow direction 20 is thus axial. The respective flow paths through the filter 10''' are thus minimal in length. In contrast, the flow through the filter 10" according to FIG. 8*b* is radial. The round filter surfaces of the filter 10" are bounded on one side, for example, by the filter receptacle 40 and the opposite side by the filter cover 50. In this version, the fluid to be filtered may be introduced, at least in portions, via the side surface or circulating surface located between the round filter surfaces, i.e. the fluid inlet surface 11 corresponds, at least in portions, to the circulating surface. In the embodiment shown, the filter 10" comprises a through opening in the center, the outer wall of which around the longitudinal axis configures the fluid outlet surface 12, at least in portions. Through the opening 51 of the filter cover 50, the fluid exiting the fluid outlet surface 12 may escape into the environment. The main flow 20 is thus radial and thus elongated with respect to an axial main flow. In other words, the flow through the filter 10" is transverse to its shortest extension until it reaches the opening 51 in the filter cover 50.

Figure 9:
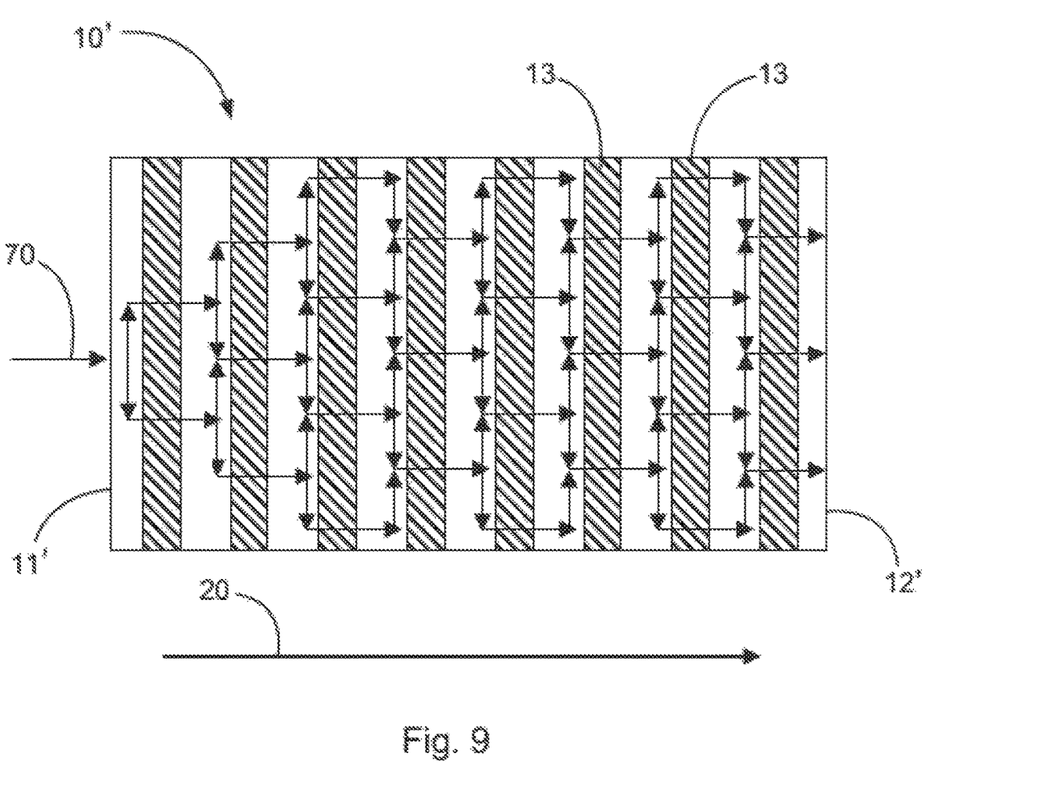
FIG. 9 shows a schematic representation of the flow through a filter according to a further exemplary embodiment according to the invention using filter layers formed by fabric structures.
Figure 10:
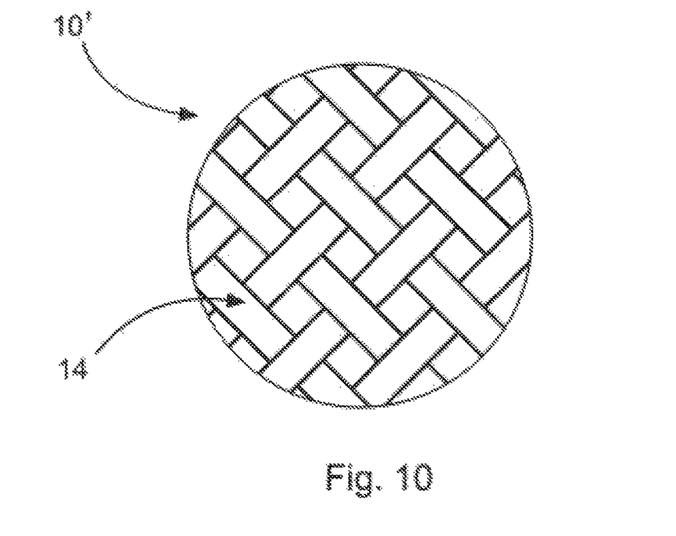
FIG. 10 shows a schematic representation of an enlarged portion of a filter layer according to FIG. 9 as viewed in the main flow direction.

The flow path of a fluid to be filtered may also be elongated by repeatedly deflecting it in a respective filter. For this purpose, FIG. 9 shows an exemplary filter design based on filter 10'. The filter 10' has a main flow direction 20 according to the fluid inlet surface 11' and the fluid outlet surface 12'. A plurality of filter layers 13 are successively arranged in the main flow direction 20, extending perpendicularly to the main flow direction 20. A flow path 70 of a fluid entering the filter 10' in the main flow direction 20 encounters the filter layer 13 and is at least partially deflected. If the filter layer 13 is formed, for example, from a fabric structure 14 shown in FIG. 10, lateral flow paths, i.e., flow path portions perpendicular to the main flow direction 20, may be deflected and are not directed back in the main flow direction 20 until a passage opening formed by the fabric structure 14 is reached. This is then repeated as each filter layer 13 is reached, provided that the fabric structure 14 with fabric portions is located in the flow path. Even though individual fabric fibers of the fabric structure 14 may take up fluid components, the above explanation serves to subdivide a flow path 70 in principle into components in the main flow direction 20 and laterally thereto in order to elongate the flow path 70 as a whole, at least proportionally. On the one hand, the elongation of the flow path 70 may be used to ensure that the substances to be filtered are filtered as completely as possible in a more reliable manner. In addition, the filter volume may also be better utilized, as can be seen from the widening of the flow path 70 in FIG. 9.

Figure 11A:
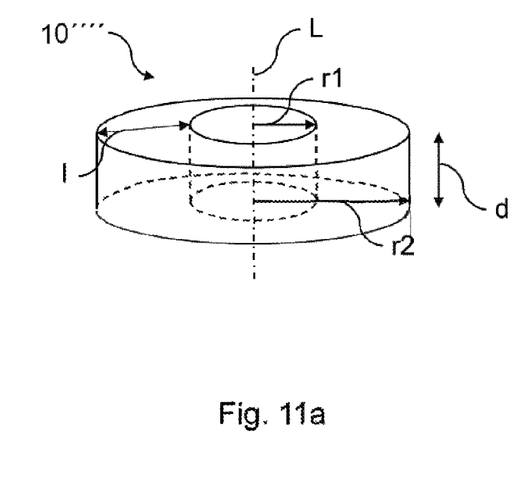
FIG. 11a shows a perspective view of a further exemplary embodiment of a filter as a cylindrical hollow body.

FIG. 11*a* shows a perspective view of a further exemplary embodiment of a filter 10"" as a cylindrical hollow body. A longitudinal axis L of the cylindrical hollow body is surrounded by the (inner) wall of the cylindrical hollow body. In other words, the wall of the hollow cylindrical body is parallel to the longitudinal axis L and surrounds the latter radially. The filter 10"" is formed by a cylindrical hollow body having a filter thickness d extending in the direction of the longitudinal axis L. Starting from a central axis, which in the present case corresponds to the longitudinal axis L, the inner wall of the cylindrical hollow body has a radius r1 and the outer wall has a radius r2. The filter length 1 in the radial direction is thus r2 minus r1. Although the cylindrical hollow body in this embodiment has a circular cross-section perpendicular to the longitudinal axis L, in alternative embodiments the cylindrical hollow body may also be configured to be elliptical in a cross-section perpendicular to the longitudinal axis L. In other alternative embodiments, the hollow body may also be rectangular or otherwise configured as a polygon in a cross-section perpendicular to the longitudinal axis L.

Figure 11B:
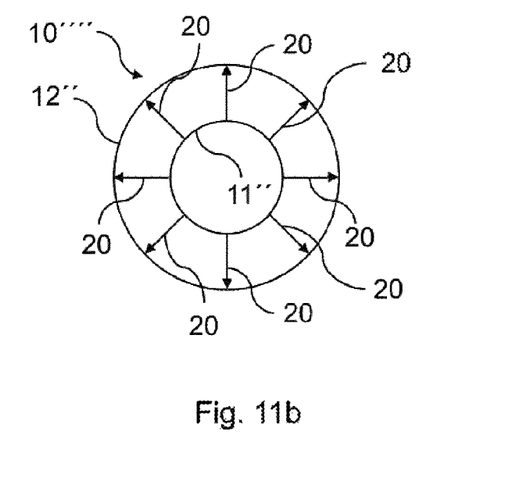
FIG. 11b shows a schematic representation of the filter shown in FIG. 11a in a plan view.

FIG. 11*b* shows a schematic representation of the filter 10"" shown in FIG. 11*a* in a top view, i.e., looking in the direction of the longitudinal axis L. The filter 10"" is intended to be flowed through in a radial direction with respect to the longitudinal axis L, resulting in main flow directions 20 shown by the arrows. The main flow directions 20 may be perpendicular to the longitudinal axis L or diagonal in the radial direction. Herein, the representation of the main flow directions 20 refers to a unidirectional course. However, the filter 10"" also filters in the reverse direction such that in principle, as is also applicable to the other filters, bidirectional filtering may be used. In the end, this then actually results in the representation of the respective main flow directions 20 as double arrows, wherein the representation in FIG. 11*b* with regard to the fluid inlet surface 11" and fluid outlet surface 12" shown with a radial flow to the outside according to the unidirectional arrows merely indicates the unidirectional course for simplification.

In the embodiment shown here, the filter length 1 and thus the filter portion is longer than the filter thickness d. Herein, the inner wall of the filter 10"" forms the fluid inlet surface 11" and the outer wall of the filter 10"" forms the fluid outlet surface 12". In an alternative embodiment, the fluid outlet surface may also be formed by at least one of the front faces, i.e. the faces perpendicular to the longitudinal axis L, of the filter 10"" when the main flow directions 20 or at least part thereof are diagonal. In particular, the filter portion is still longer than the filter thickness d. In a further alternative embodiment, one of the front faces may also be used as a fluid inlet surface for at least part of the main flow directions 20, the inner wall and/or the outer wall of the filter 10"" serving as a fluid outlet surface for such a main flow direction 20. Due to the corresponding diagonal path, the filter portion is also preferably longer than the filter thickness d in this case.

Figure 12:
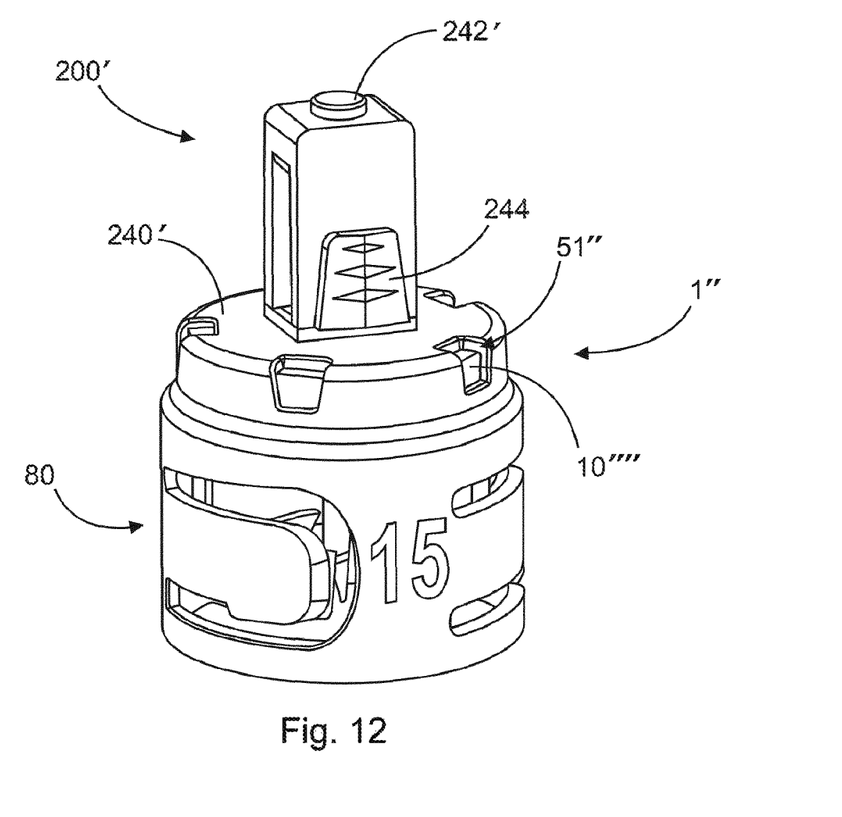
FIG. 12 shows a perspective view of an exemplary embodiment of a withdrawal spike for use with a filter system according to the invention.

FIG. 12 shows a perspective view of an exemplary embodiment of a withdrawal spike 200' for use with a filter system 1" according to the invention with a filter 10"". The withdrawal spike 200' includes the filter system 1" with the filter 10", a vent housing portion 240' with openings 51", a fluid opening 242' configured here as a dry-closing connection, and a gripping portion 244 by means of which the withdrawal spike 200' may be placed on a vial adapter 80 or inserted together therewith into a vial (not shown). In an alternative embodiment, the withdrawal spike ix) 200' may also be placed directly on a vial, i.e. without the vial adapter 80.

Figure 13:
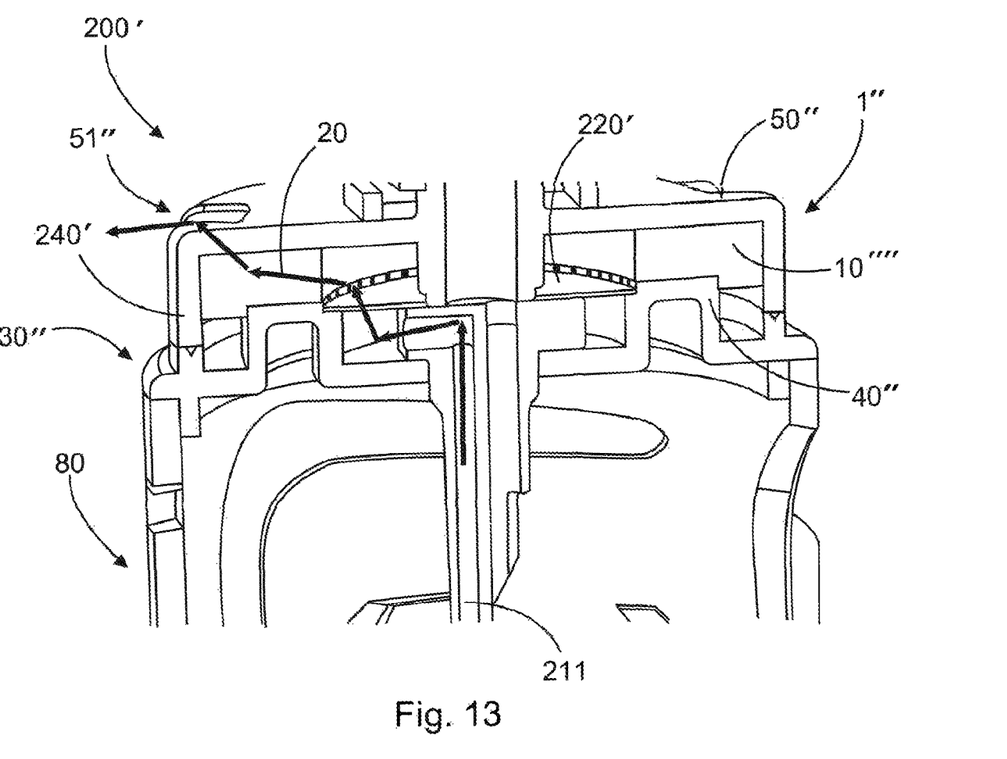
FIG. 13 shows a perspective sectional view of the withdrawal spike according to FIG. 12.

In this regard, FIG. 13 shows a perspective sectional view of the withdrawal spike 200' according to FIG. 12. The filter 10"" is held in a filter housing 30" by a filter cover 50" in cooperation with a filter receptacle 40". The distance between the filter receptacle 40" and the filter cover 50" in the direction of the longitudinal axis L of the filter 10"" being a cylindrical hollow body is smaller than the filter thickness d in the direction of the longitudinal axis. As a result, the filter 10"" is not only held fixed in position in the filter housing 30", but is also compressed in the direction of the longitudinal axis L. The compression ensures that the filter 10"" abuts in this portion against the surfaces of the filter receptacle 40" and the filter cover 50" that are opposite in the direction of the longitudinal axis L. The filter cover 50" also comprises the openings 51", which in the embodiment shown extend in an L-shape over an edge portion of the filter 10"" that is external in the radial direction with respect to the longitudinal axis L and facing away from the filter receptacle 40". In other words, the fluid outlet surface 12" of the respective opening 51" is formed over a surface portion of the filter 10"" comprising both a part of the outer wall in a portion facing away from the filter receptacle 40" and a part of the front face facing away from the filter receptacle 40" and joining the outer edge of the filter 10"" in a radial direction with respect to the longitudinal axis L. In addition, a hydrophobic air filter 220' is disposed between the vent channel 211 and the fluid inlet surface 11" of the filter 10"". Moreover, in an alternative embodiment, another additional hydrophobic air filter may be arranged directly at the outlet of the vent channel 211. Accordingly, this filter is located between the vent channel 211 and the air filter 220'. The additional hydrophobic air filter may reduce complications related to a residual volume in the event of incorrect handling. An upwardly oriented tip of the piercing mandrel with the vial positioned above the piercing mandrel during an injection of a fluid into the vial may be such a misuse.

In appropriate use according to the embodiment of FIG. 13, a gaseous fluid is passed from a vial through the vent channel 211. The fluid first flows through the hydrophobic air filter 220'. The gaseous components are allowed to pass through the hydrophobic air filter 220', while liquid components and particles, microorganisms and aerosols contained in the gaseous fluid are retained. Subsequently, the gaseous fluid passes through the filter 10"", which is configured as an activated carbon filter. Toxic components of the gaseous fluid are then filtered through the filter 10"" such that they do not escape to the outside through the openings 51. The inner wall of the filter 10"" extending radially around the longitudinal axis serves as the fluid inlet surface 11". The gaseous fluid entering the filter 10"" through the fluid inlet surface 11" thereby finds the shortest path to the respective fluid opening 51". Since the respective fluid opening 51" is arranged on a radially outer side opposite the filter receptacle 40" in the direction of the longitudinal axis L, the main flow path here does not run perpendicular to the longitudinal axis L of the filter 10"", but is angled in the direction of the opening 51, i.e. diagonally. For pressure equalization, air entering the withdrawal spike 200' from the outside then passes through the withdrawal spike 200' in the opposite direction, i.e. first through the filter 10"" and then through the hydrophobic air filter 220'.

FIGS. 14*a* to 14*c* show perspective views of a further exemplary embodiment of a filter 10*v* as a cylindrical hollow body. While all other reference signs and the corresponding descriptions of FIGS. 11*a* and 11*b* are also applicable to this embodiment, in contrast to the embodiment according to FIG. 11, the filter 10*v* of this embodiment has different dimensions. Here, the thickness d of the filter (corresponding to height of the hollow cylinder) is greater than the length 1 (corresponding to cross-sectional length of the hollow cylinder). The embodiment of FIGS. 14*a* to 14*c* allows for a very variable design when installing the filter 10*v* in the filter housing (not shown) of the filter system, wherein the highest possible filter efficiency is achieved despite limited installation space in the filter housing.

The main flow direction is defined by the corresponding installation/arrangement of the at least one fluid opening for fluid inlet into the hollow cylinder forming the fluid inlet surface(s) (E1 to E8 in FIG. 14*a*; E in FIGS. 14*b* and 14*c*) and the at least one fluid opening for fluid outlet from the hollow cylinder forming the fluid outlet surface(s) (A1 to A8 in FIG. 14*a*; A in FIGS. 14*b* and 14*c*). Thus, the main flow direction may be either radial only from the inner wall of the hollow cylinder (fluid inlet surface E) outward to the outer wall of the hollow cylinder (fluid outlet surface A) if the fluid opening with the fluid inlet surface extends partially or completely over the inner wall and if the fluid opening with the fluid outlet surface extends partially or completely over the outer wall of the hollow cylinder, as shown in FIG. 14*b* for full extension. Alternatively, the main flow direction may be only axially along and parallel to the longitudinal axis (L) of the hollow cylinder if the fluid opening with the fluid inlet surface is partially or completely arranged at one front face of the hollow cylinder and the fluid opening with the fluid outlet surface is partially or completely arranged at the other front face of the hollow cylinder, as shown in FIG. 14*c* for their arrangement entirely at the front faces. In a further modification, both possibilities are combined, as shown in FIG. 14a, wherein fluid openings with respective fluid inlet surfaces E1 to E8 are each arranged partially on one front face with partial extension over the outer wall, and fluid openings with respective fluid outlet surfaces A1 to A8 are each arranged partially on the other front face likewise with partial extension over the outer wall, by appropriate installation in the housing. The effect thereof is that the main flow direction is both radial and axial. Further alternatives and combinations are possible, e.g. that the fluid inlet surfaces E1 to E8 and fluid outlet surfaces A1 to A8 do not each extend over the outer wall as shown in FIG. 14a, but that both groups E1 to E8 and A1 to A8 extend over the inner wall, or that alternatingly one group (e.g. for example E1 to E8) extends over the inner wall and the other group (A1 to A8) extends over the outer wall, or that both groups E1 to E8 and A1 to A8 extend over both the inner wall and the outer wall of the hollow cylindrical body. In a further modification, not eight but a different number of fluid inlet surfaces En and of fluid outlet surfaces Am are provided, where n and m may be independently selected from an integer of, for example, 1 to 12. Also, the arrangements of the fluid inlet surfaces E and fluid outlet surfaces A defined by the respective fluid openings may be interchanged, i.e., the E or E1, E2, E3 . . . in FIGS. 14a-14c would become A or A1, A2, A3 . . . by reversing the flow direction, and vice versa. For example, analogously to FIG. 14b, the main flow direction would then be radially from outside to inside.

Also, the dimensions d, 1, r1 and r2 of the cylindrical hollow body of the filter 10' of FIGS. 14a-14c may be varied without changing the basic principle.

Due to the matching arrangement of openings for inlet into the filter and for outlet out of the filter, the main flow direction may be directed in diagonal direction in these modified embodiments such that the main flow direction again has the larger or at least the same extension compared to at least one direction transverse thereto.

Figure 15A:
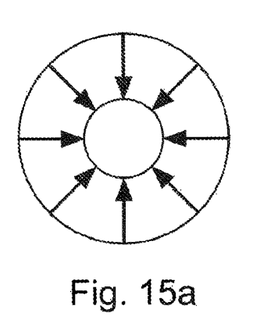
FIGS. 15a to 15c schematically show different flow paths through a filter.
Figure 15B:
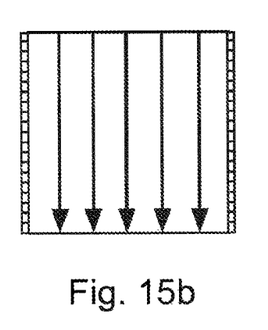

The embodiments shown in FIGS. 14a to 14c and the described modifications thereof have the advantage that two favorable effects may be achieved and even combined: the radial main flow direction or the radial flow contribution to the total flow—especially if it represents the sole flow direction according to FIG. 14b over the entire length L from the inner wall to the outer wall of the cylindrical hollow body—provides stable radial flow properties, as schematically shown in FIG. 15a by corresponding flow arrows; the axial main flow direction or the axial flow contribution to the total flow along and parallel to the longitudinal axis (L) of the hollow cylinder—especially if it represents the sole flow direction according to FIG. 14c over the entire length L from one front face to the other front face of the cylindrical hollow body—provides for a longer main flow path in a given installation space, as schematically shown in FIG. 15b by corresponding flow arrows; and in the case of the combination according to FIG. 14a, both effects may be combined particularly well. These variable modes of fluid flow through the filter ensures that the entire volume of the filter is effectively used to filter and remove contaminant components. The selection of a balance between volume on the one hand, which is dictated by the filter housing of the filter system or by the installation space available in a fluid transfer system, and flow length and flow type on the other hand ensures that filter efficiency is significantly improved.

Figure 15C:
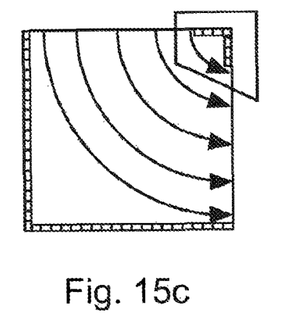

In conventional filter systems, irregular fluid flows through the filter occur such that parts of the filter may not be used at all for effective filtration: as shown schematically in FIG. 15c by corresponding flow arrows, there are then sometimes very short flow paths, and/or parts of the filter volume are not flowed through at all such that filter efficiency is limited. The conventionally occurring problem of irregular fluid flow is even aggravated by the fact that contaminant components such as contaminant particles tend to take the shortest path, for example in the area of the filter shown in FIG. 15c in the form of a small box. This problem comes into play especially if there is limited installation space available in the filter housing, as is the case in the filter systems and fluid transfer systems described herein.

The filter system according to the embodiments of FIGS. 14a to 14c and their possible modifications are installed together with the housing in a closed fluid transfer system. As examples of possible closed fluid transfer systems and/or further elements of suitable filter systems, reference is made to the fluid transfer systems 100 described above and shown in the respective preceding figures and the further elements of the filter systems 1, 1' and 1", in particular to FIGS. 1 to 13 and their descriptions.

Further modifications consist in the fact that the filter system according to the invention, in particular the filter installed in a closed fluid transfer system, is combined with further functional elements, for example with valve(s), with further fluid and/or vent passages/cannulas, with vial adapters, and/or with further filter elements.

The invention is not limited to the described embodiments. In particular, certain features of one embodiment are in principle also applicable to other embodiments, unless reasonably excluded.

The invention claimed is:

1. A filter system for a closed fluid transfer system with pressure equalization, the filter system comprising:
 a filter having a main flow direction for a fluid passing through the filter, the main flow direction extending along a fluid flow pathway from a fluid inlet surface to a fluid outlet surface; and
 a filter housing,
 the filter having a measured thickness and being constructed such that the length of the fluid flow pathway through the filter is greater than the measured thickness of the filter,
 the filter housing comprising a filter receptacle,
 the filter being held in the filter receptacle by a filter cover, and
 the filter cover comprising an opening through which a fluid passing through the filter may be discharged to an environment located on the side of the filter cover facing away from the filter.

2. The filter system according to claim 1,
 wherein the filter cover abuts, at least in portions, against a surface of the filter that is substantially perpendicular to the main flow direction of the fluid passing through the filter, or
 wherein the filter cover abuts, at least in portions, against a surface of the filter that is substantially parallel to the main flow direction of the fluid passing through the filter.

3. The filter system according to claim 1, wherein the filter is surrounded, at least in portions, by a support element in a direction substantially parallel to the main flow direction of the fluid passing through the filter, the support element being elastically deformable.

4. The filter system according to claim 3, wherein the support element extends from an end of the filter facing away from the filter cover over a length of 1 mm to 15 mm.

5. The filter system according to claim 1,
wherein the filter has an extension of at least 2 mm and at most 15 mm in the main flow direction of the fluid passing through the filter, and/or
wherein the filter has a volume of at least 60 mm$^3$ and at most 400 mm$^3$.

6. The filter system according to claim 1, wherein the filter system is non-detachably connectable to the closed fluid transfer system.

7. The filter system according to claim 1, wherein the filter is surrounded rotationally symmetrically in a radial direction with respect to the main flow direction of the fluid passing through the filter by a filter receptacle of the filter housing, and/or a filter cover, which abuts at least in portions against a surface of the filter that is substantially perpendicular to the main flow direction of the fluid passing through the filter, and/or an elastically deformable support element.

8. The filter system according to claim 1, wherein the filter is configured such that the fluid flow pathway through the filter is longer than a dimension of the filter in the main flow direction of the fluid passing through the filter.

9. The filter system according to claim 1, wherein the filter comprises at least two filter layers extending substantially perpendicular to the main flow direction.

10. The filter system according to claim 9, wherein the filter or at least one of the at least two filter layers comprises a deflecting structure.

11. The filter system according to claim 9, wherein the at least two filter layers comprise at least two successive filter layers having a fabric structure, each of which is offset relative to the other.

12. The filter system according to claim 1,
wherein the filter is configured as a cylindrical solid body, or
wherein the filter is configured as a hollow body comprising at least one opening into the hollow body.

13. The filter system according to claim 1, wherein the filter is configured as a hollow cylinder having a longitudinal axis.

14. The filter system according to claim 13,
wherein the filter is provided with at least one fluid opening for fluid inflow into the hollow cylinder, forming at least one fluid inlet surface,
wherein the filter is provided with at least one fluid opening for fluid outflow from the hollow cylinder, forming at least one fluid outlet surface, and
wherein the at least one fluid inlet surface and/or the at least one fluid outlet surface of the hollow cylinder are configured such that the main flow direction is either only radial from an inner wall of the hollow cylinder, or only axial along and parallel to the longitudinal axis of the hollow cylinder, or combined both radial and axial.

15. The filter system according to claim 14, wherein an inner wall of the hollow cylinder parallel to the longitudinal axis of the hollow cylinder is configured, at least in portions, as the at least one fluid inlet surface and/or the at least one fluid outlet surface.

16. The filter system according to claim 1, wherein the filter is hydrophobic.

17. The filter system according to claim 1,
wherein the filter housing is sealed such that smoke is not released outside of the filter housing when smoke-forming TiCl$_4$ is introduced in the filter housing, and/or
wherein up to at least 200 ml of smoke-forming TiCl$_4$ can be absorbed by the filter.

18. The filter system according to claim 1 further comprising a withdrawal spike,
wherein the withdrawal spike is configured to withdraw medical fluids from medical containers as part of a medical fluid transfer system,
wherein the withdrawal spike comprises a piercing mandrel with a vent channel, and
wherein the filter system is flow-connected to the vent channel.

19. The filter system according to claim 18,
wherein the withdrawal spike further comprises a liquid channel, and the liquid channel is flow-connected to a liquid filter, and/or
wherein the withdrawal spike further comprises an additional air filter and/or liquid filter flow-connected to the vent channel.

20. The filter system according to claim 19,
wherein the additional air filter and/or liquid filter is arranged between the filter and the vent channel, and/or
wherein the additional air filter and/or liquid filter is held in a positionally fixed manner in the withdrawal spike by the filter.

21. The filter system according to claim 1, further comprising a medical fluid transfer system for transferring medical fluids from one medical container to another medical container.

22. The filter system according to claim 1, wherein the filter is an activated carbon filter.

* * * * *